(12) United States Patent
Ratasuk et al.

(10) Patent No.: US 9,031,017 B2
(45) Date of Patent: May 12, 2015

(54) POWER CONTROL FOR LTE DEPLOYMENT IN UNLICENSED BAND

(75) Inventors: Rapeepat Ratasuk, Hoffman Estates, IL (US); Mikko Aleksi Uusitalo, Helsinki (FI); Nitin Mangalvedhe, Hoffman Estates, IL (US); Antti S. Sorri, Helsinki (FI); Sassan Iraji, Espoo (FI)

(73) Assignee: Nokia Solutions and Networks Oy

( * ) Notice: Subject to any disclaimer, the term of this patent is extended or adjusted under 35 U.S.C. 154(b) by 129 days.

(21) Appl. No.: 13/529,032

(22) Filed: Jun. 21, 2012

(65) Prior Publication Data

US 2013/0343288 A1 Dec. 26, 2013

(51) Int. Cl.
*H04W 4/00* (2009.01)
*H04W 52/24* (2009.01)
*H04W 72/12* (2009.01)
*H04W 16/14* (2009.01)
*H04W 52/22* (2009.01)
*H04W 52/28* (2009.01)

(52) U.S. Cl.
CPC .............. *H04W 52/24* (2013.01); *H04W 16/14* (2013.01); *H04W 72/1215* (2013.01); *H04W 72/1231* (2013.01); *H04W 52/228* (2013.01); *H04W 52/242* (2013.01); *H04W 52/243* (2013.01); *H04W 52/283* (2013.01)

(58) Field of Classification Search
USPC ......................................................... 370/329
See application file for complete search history.

(56) References Cited

U.S. PATENT DOCUMENTS

| | | | |
|---|---|---|---|
| 7,236,793 B2 | 6/2007 | Amalfitano et al. | 455/453 |
| 2002/0168993 A1 | 11/2002 | Choi et al. | 455/522 |
| 2006/0209721 A1 | 9/2006 | Mese et al. | 370/254 |
| 2006/0223448 A1* | 10/2006 | Kruys | 455/69 |
| 2010/0331026 A1 | 12/2010 | Hottinen et al. | 455/501 |
| 2011/0098054 A1* | 4/2011 | Gorokhov et al. | 455/452.1 |
| 2012/0051315 A1* | 3/2012 | Wang et al. | 370/329 |
| 2012/0115534 A1* | 5/2012 | Luo et al. | 455/522 |
| 2012/0250631 A1* | 10/2012 | Hakola et al. | 370/329 |
| 2013/0156019 A1* | 6/2013 | Chen | 370/338 |
| 2014/0140314 A1* | 5/2014 | Wei et al. | 370/329 |

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP TS 36.213 V10.50.0, Mar. 2012, 125 pgs.

(Continued)

*Primary Examiner* — Edan Orgad
*Assistant Examiner* — Rebecca Song
(74) *Attorney, Agent, or Firm* — Harrington & Smith

(57) ABSTRACT

Methods of power control for LTE transmissions in unlicensed bands are described. One method includes determining, at a first device (such as a LTE UE or LTE eNB), a scheduled transmission window for a LTE transmission in an unlicensed band. The transmission window indicates a time for sending the transmission in the unlicensed band. Prior to the scheduled transmission window, the method also includes determining whether a WiFi transmitter is transmitting a signal in the unlicensed band. The method also includes, in response to determining that the transmitter is transmitting in the unlicensed band, determining an adjusted transmission power for the transmission and sending the transmission (such as from an LTE UE to an LTE eNB or from an LTE eNB to an LTE UE) in the transmission window at the adjusted transmission power. Apparatus and computer readable media are also described.

20 Claims, 11 Drawing Sheets

(56) References Cited

OTHER PUBLICATIONS

"Latent state models of primary user behavior for opportunistic spectrum access", Joni Pajarinen et al., IEEE PIMRC 2009, 6 pgs.

"Femtocell and Beacon Transmit Power Self-Calibration", Chirag Patel, et al., Qualcomm Whitepaper, Feb. 2010, 7 pgs.

"A Power Controlled Multiple Access Protocol for Wireless Packet Networks", Jeffrey P. Monks, et al., IEEE 2001, 10 pgs.

"Spectrum Co-existence of IEEE 802.11b and 802.16a Networks Using Reactive and Proactive Etiquette Policies", Xiangpeng Jing et al., Mobile New Appl,, 2006 pp. 539-554.

"Performance of Uplink Fractional Power Control in UTRAN LTE", Carlos Ubeda Castellanos et al., IEEE 2008, pp. 2517-2521.

"Patentable subject matter", Wikipedia, May 2012, 7 pgs.

"WLAN Radio Frequency Design Considerations", Cisco, Enterprise Mobility 4.1 Design Guide, May 2012, 17 pgs.

Machine Leming Methods for CDMA Power Control and Direction of Arrival Estimation, Judd A. Rohwer, Signals, Systems and Computer, 2003, 179 pgs.

IEEE; Muhammad Imadur Rahman, et al.; "License-exempt LTE systems for secondary spectrum usage: scenarios and first assessment"; 2011 IEEE International Symposium on Dynamic Spectrum Access Networks (DySPAN); (2011), (pp. 349-358).

Draft ETSI TR 103 067 vo.o.i4 (Apr. 2012); Reconfigurable Radio Systems (RRS); Feasibility Study on Radio Frequency (RF) Performances for Cognitive Radio Systems Operating in UHF TV Band White Spaces; (pp. 1-80).

IEEE; Feilu Liu, et al.; "A Framework for Femtocells to Access Both Licensed and Unlicensed Bands"; (2011) (pp. 407-411).

IEEE 802.11a-1999—IEEE Standard for Telecommunications and Information Exchange Between Systems—LAN/MAN Specific Requirements—Part11: Wireless Medium Access Control (MAC) and physical layer (PHY) specifications: High Speed Physical Layer in the 5 GHz band, (1999), (82 pages).

\* cited by examiner

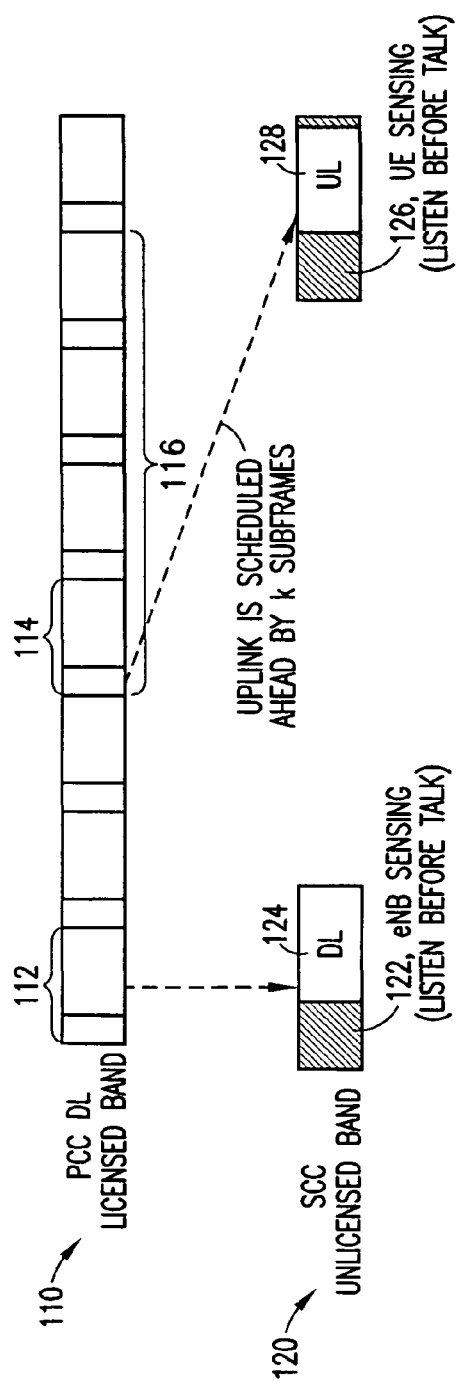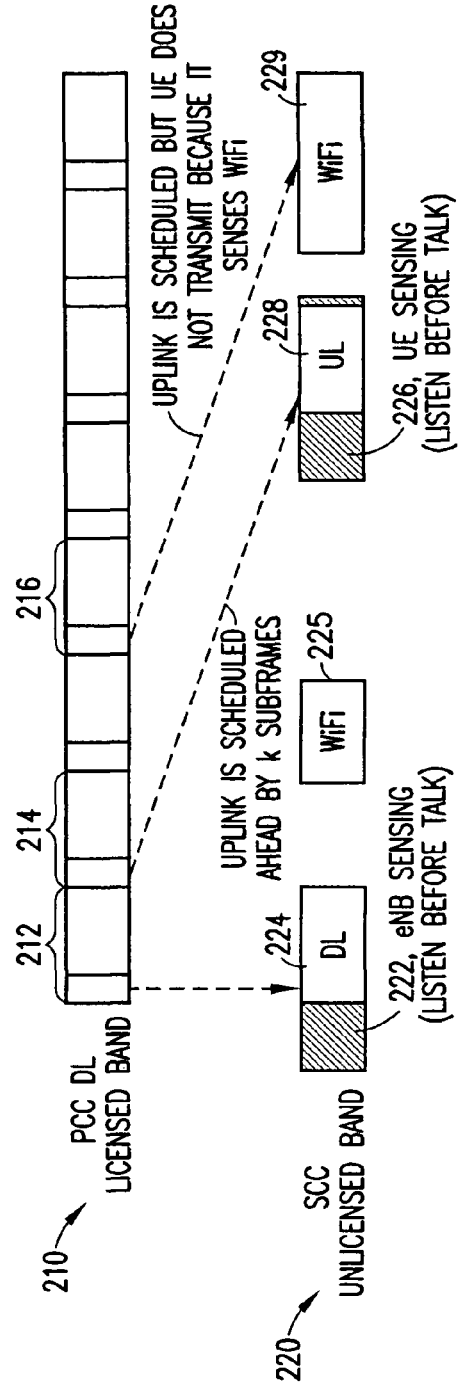

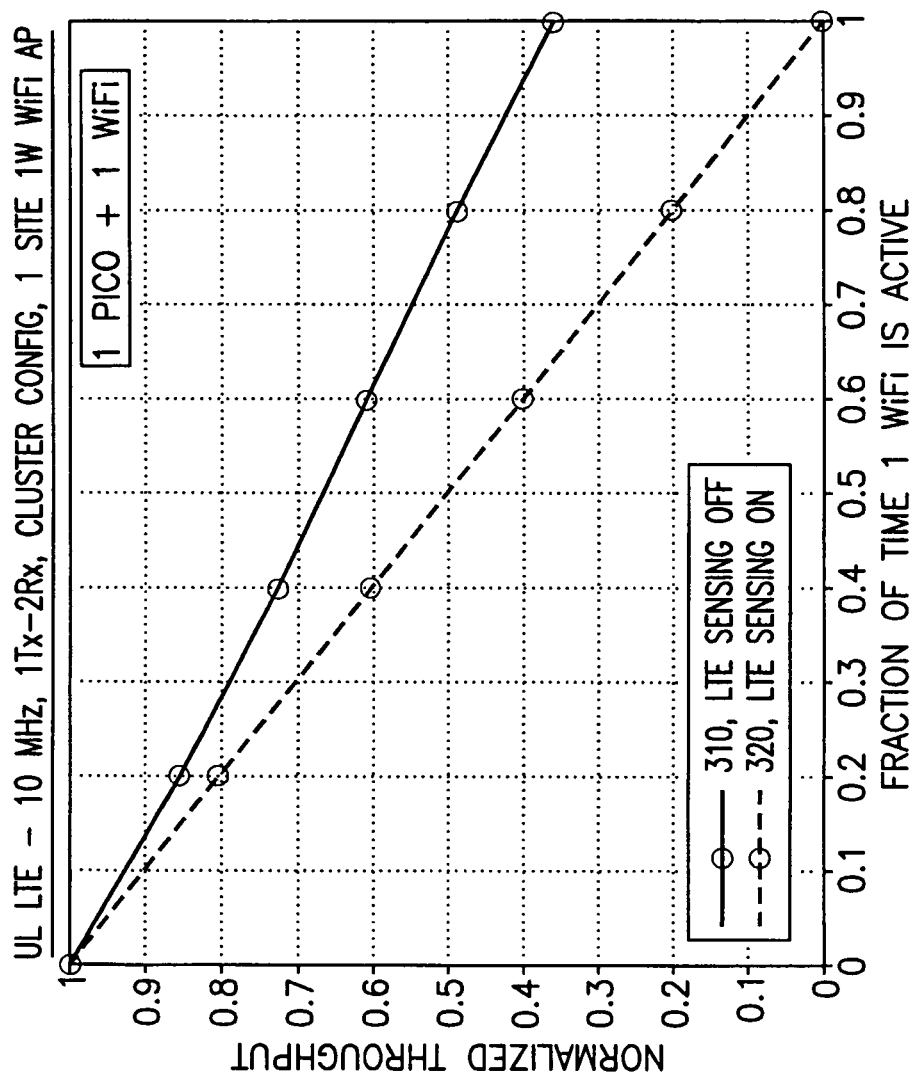

POWER CONTROL FOR LTE DEPLOYMENT IN UNLICENSED BAND

TECHNICAL FIELD

The exemplary and non-limiting embodiments relate generally to wireless communication systems, methods, devices and computer programs and, more specifically, relate to power control for transmissions in unlicensed bands.

BACKGROUND

This section is intended to provide a background or context. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
AP access point (such as a base station, relay node, wireless router, etc.)
BW bandwidth
CA carrier aggregation
CC component carrier
CSI channel status information
CTS clear to send
DL downlink (eNB towards UE)
DMRS demodulation reference signal
eNB E-UTRAN Node B (evolved Node B)
E-UTRAN evolved UTRAN (LTE)
IMT-A international mobile telephony-advanced
LTE long term evolution of UTRAN (E-UTRAN)
MAC medium access control (layer 2, L2)
Node B base station
PCC primary control carrier
PDCP packet data convergence protocol
PHY physical (layer 1, L1)
RB resource block
RTS request to send
SCC secondary control carrier
UE user equipment, such as a mobile station or mobile terminal
UL uplink (UE towards eNB)
UTRAN universal terrestrial radio access network
WiFi wireless local area network based on the IEEE 802.11 standard A terminal or mobile device may simultaneously receive one or multiple component carriers (CC) depending on its capabilities. A LTE-A terminal with reception capability beyond 20 MHz can simultaneously receive transmissions on multiple component carriers. A LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

With further regard to carrier aggregation, what is implied is that one eNB can effectively contain more than one cell on more than one CC (frequency carrier), and the eNB can utilize one (as in E-UTRAN Rel-8) or more cells (in an aggregated manner) when assigning resources and scheduling the UE.

SUMMARY

The below summary section is intended to be merely exemplary and non-limiting.

The foregoing and other problems are overcome, and other advantages are realized, by the use of the exemplary embodiments.

In a first aspect thereof an exemplary embodiment provides a method of power control for LTE transmissions in unlicensed bands. The method includes determining, at a first device (such as a LTE UE or LTE eNB), a scheduled transmission window for a transmission of an LTE system operating in an unlicensed band. The transmission window indicates a time for sending the transmission in the unlicensed band. Prior to the scheduled transmission window, the method also includes determining, by the first device, whether a WiFi transmitter is transmitting a signal in the unlicensed band. The transmitter is separate from the LTE system. The method also includes, in response to determining that the transmitter is transmitting in the unlicensed band, determining an adjusted transmission power for the transmission and sending, from the first device to a second device (such as from an LTE UE to an LTE eNB or from an LTE eNB to an LTE UE), the transmission in the transmission window at the adjusted transmission power.

In another aspect thereof an exemplary embodiment provides an apparatus for power control for LTE transmissions in unlicensed bands. The apparatus (such as an LTE UE and an LTE eNB) includes at least one processor; and at least one memory storing computer program code. The at least one memory and the computer program code are configured to, with the at least one processor, cause the apparatus to perform actions. The actions include to determine a scheduled transmission window for a transmission of an LTE system operating in an unlicensed band. The transmission window indicates a time for sending the transmission in the unlicensed band. Prior to the scheduled transmission window, the actions also include to determine whether a transmitter is transmitting a signal in the unlicensed band. The transmitter is separate from the LTE system. The actions also include, in response to determining that the transmitter is transmitting in the unlicensed band, to determine an adjusted transmission power for the transmission and to send, to a second apparatus, the transmission in the transmission window at the adjusted transmission power.

In a further aspect thereof an exemplary embodiment provides a computer readable medium for power control for LTE transmissions in unlicensed bands. The computer readable medium is tangibly encoded with a computer program executable by a processor to perform actions. The actions include determining, at a first device (such as an LTE UE or an LTE eNB), a scheduled transmission window for a transmission of an LTE system operating in an unlicensed band. The transmission window indicates a time for sending the transmission in the unlicensed band. Prior to the scheduled transmission window, the actions also include determining, by the first device, whether a transmitter is transmitting a signal in the unlicensed band. The transmitter is separate from the LTE system. The actions also include, in response to determining that the transmitter is transmitting in the unlicensed band, determining an adjusted transmission power for the transmission and sending, from the first device to a second device, the transmission in the transmission window at the adjusted transmission power.

In another aspect thereof an exemplary embodiment provides an apparatus (such as an LTE UE or an LTE eNB) for power control for LTE transmissions in unlicensed bands. The apparatus includes means for determining a scheduled transmission window for a transmission of an LTE system operating in an unlicensed band. The transmission window indicates a time for sending the transmission in the unlicensed band. Prior to the scheduled transmission window, the apparatus also includes means for determining whether a transmitter is transmitting a signal in the unlicensed band. The transmitter is separate from the LTE system. The apparatus also includes means for determining an adjusted transmission power for the transmission and sending, to a second device, the transmission in the transmission window at the adjusted transmission power in response to determining that the transmitter is transmitting in the unlicensed band.

In a further aspect thereof an exemplary embodiment provides a method for power control for LTE transmissions in unlicensed bands. The method includes allocating a plurality of transmission windows to a plurality of mobile devices of an LTE system operating in an unlicensed band. The transmission window indicates a time for sending a transmission in the unlicensed band. The method also includes determining whether to authorize individual mobile devices of the plurality of mobile devices are to send the associated transmission in the transmission window using an adjusted transmission power if a transmitter is determined to be transmitting a signal in the unlicensed band during the transmission window. The method also includes sending, to each mobile device, an indication of a transmission window allocated to the mobile device and an indication of whether the mobile device is authorized to send the associated transmission in the transmission window using an adjusted transmission power if a transmitter is determined to be transmitting a signal in the unlicensed band during the transmission window.

In another aspect thereof an exemplary embodiment provides an apparatus of power control for LTE transmissions in unlicensed bands. The apparatus (such as an LTE eNB) includes at least one processor; and at least one memory storing computer program code. The at least one memory and the computer program code are configured to, with the at least one processor, cause the apparatus to perform actions. The actions include to allocate a plurality of transmission windows to a plurality of mobile devices of an LTE system operating in an unlicensed band. The transmission window indicates a time for sending the transmission in the unlicensed band. The actions also include to determine whether to authorize individual mobile devices of the plurality of mobile devices are to send the associated transmission in the transmission window using an adjusted transmission power if a transmitter is determined to be transmitting a signal in the unlicensed band during the transmission window. The actions also include to send, to each mobile device, an indication of a transmission window allocated to the mobile device and an indication of whether the mobile device is authorized to send the associated transmission in the transmission window using an adjusted transmission power if a transmitter is determined to be transmitting a signal in the unlicensed band during the transmission window.

In a further aspect thereof an exemplary embodiment provides a computer readable medium for power control for LTE transmissions in unlicensed bands. The computer readable medium is tangibly encoded with a computer program executable by a processor to perform actions. The actions include allocating a plurality of transmission windows to a plurality of mobile devices of an LTE system operating in an unlicensed band. The transmission window indicates a time for sending a transmission in the unlicensed band. The actions also include determining whether to authorize individual mobile devices of the plurality of mobile devices are to send the associated transmission in the transmission window using an adjusted transmission power if a transmitter is determined to be transmitting a signal in the unlicensed band during the transmission window. The actions also include sending, to each mobile device, an indication of a transmission window allocated to the mobile device and an indication of whether the mobile device is authorized to send the associated transmission in the transmission window using an adjusted transmission power if a transmitter is determined to be transmitting a signal in the unlicensed band during the transmission window.

In another aspect thereof an exemplary embodiment provides an apparatus (such as an LTE eNB) for power control for LTE transmissions in unlicensed bands. The apparatus includes means for allocating a plurality of transmission windows to a plurality of mobile devices of an LTE system operating in an unlicensed band. The transmission window indicates a time for sending a transmission in the unlicensed band. The apparatus also includes means for determining whether to authorize individual mobile devices of the plurality of mobile devices are to send the associated transmission in the transmission window using an adjusted transmission power if a transmitter is determined to be transmitting a signal in the unlicensed band during the transmission window. The apparatus also includes means for sending, to each mobile device, an indication of a transmission window allocated to the mobile device and an indication of whether the mobile device is authorized to send the associated transmission in the transmission window using an adjusted transmission power if a transmitter is determined to be transmitting a signal in the unlicensed band during the transmission window.

BRIEF DESCRIPTION OF THE DRAWINGS

The foregoing and other aspects of exemplary embodiments are made more evident in the following Detailed Description, when read in conjunction with the attached Drawing Figures, wherein:

FIG. 1 illustrates an example of an LTE deployment in an unlicensed band as part of a carrier aggregation technique.

FIG. 2 illustrates an example of a listen-before-talk LTE deployment in an unlicensed band as part of a carrier aggregation technique.

FIG. 3 shows an example of LTE performance loss with listen before talk.

DETAILED DESCRIPTION

Figure 4:
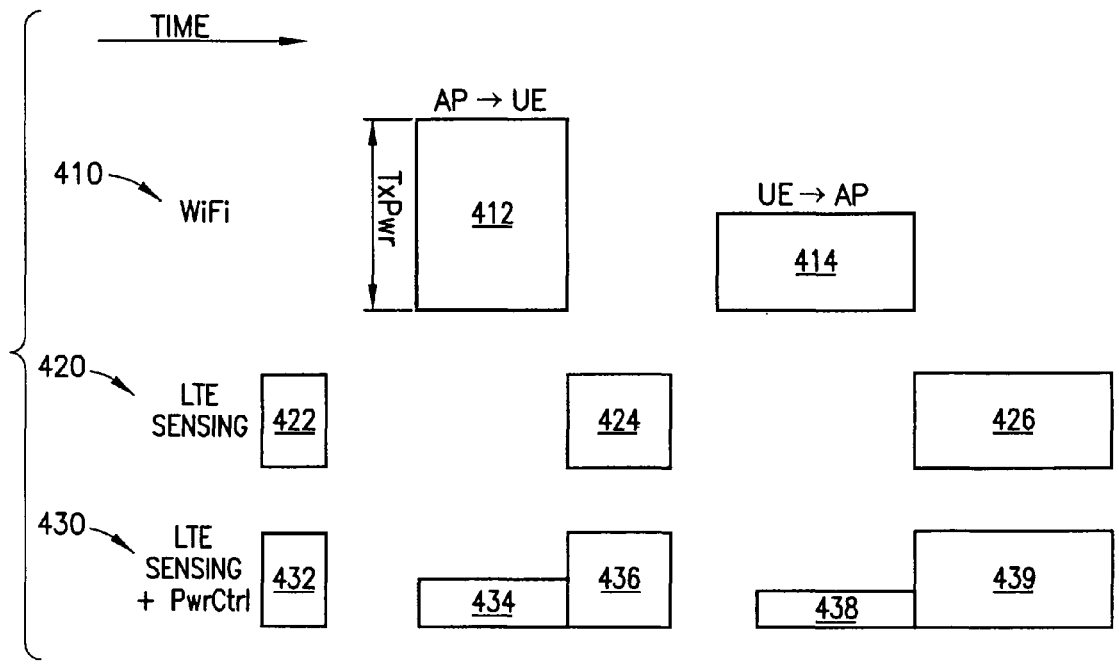
FIG. 4 is a simplified signaling transmission power-to-time chart for a WiFi system.

A conventional LTE deployment is in licensed band where the spectrum is exclusively reserved. Unlicensed deployment is being proposed as part of carrier aggregation. Unlicensed deployment includes the situation where primary DL/UL carriers (PCC) are on a licensed band while secondary carriers (SCC) are on unlicensed bands. Control information is carried on the PCC and the SCC may be used for data transmission whenever the unlicensed band is available. The SCCs in this case may be treated as extension carriers.

As used herein, a licensed band for a system is one where the spectrum is reserved for use by the system. An unlicensed band is one where the spectrum is not reserved for use by the system. Use of an unlicensed band may be characterized in that the bands usage by the system coexists with one or more other systems using that band, the other systems may have a right to use the band even to the exclusion of the first system. An unlicensed band may be lightly-licensed band, license-exempt band, a secondary usage of the licensed band or TV white space. A lightly-licensed band is one where operators must register with FCC in order to use the band, but generally does not need to purchase a license (or purchase/register for a nominal fee). Multiple operators in the same region may share the spectrum. A license-exempt band is one where operators can operate without a license but must use certified equipment and comply with coexistence requirements; however, the operators do not have exclusive user of the spectrum. A secondary usage of the licensed band is a temporary usage of a licensed spectrum by a secondary user. For example, public safety services may own a spectrum and allow commercial operators to use it when it is free, but will reclaim the spectrum for public safety usage as needed. Similar to a secondary usage of the licensed band, TV white space is a spectrum allocated to TV broadcasting but is not being used locally.

To deploy LTE in unlicensed band, a collision avoidance mechanism (such as listen before talk, RTS/CTS, etc.) is introduced in order to ensure access to the unlicensed band for other networks. One such mechanism is listen-before-talk where the LTE system is prevented from transmitting when a transmission on the unlicensed band from another device/system (such as by a WiFi system) is detected. As a result, LTE throughput is proportionally reduced by the amount of the time it is allowed to transmit.

FIG. 1 illustrates an LTE deployment in an unlicensed band as part of a carrier aggregation technique. As shown, a PCC DL is provided on a licensed band 110. The PCC DL is separated into a series of subframes such as subframe 112 and subframe 114. A SCC is provided on an unlicensed band 120.

A subframe 112, 114 may correspond to a SCC transmission, such as DL 124 and UL 128. As the SCC is an unlicensed band 120, there is possibility that other devices or networks may operate in the unlicensed band 120. In order to reduce the impact of the LTE system to these other devices or networks, the LTE system may listen for transmission on the unlicensed band 120 prior to the SCC transmission. As shown, the eNB listens during time block 122 prior to sending a DL transmission 124 on the unlicensed band 120. Similarly, a UE may listen during time block 126 prior to sending an UL transmission 128 on the unlicensed band 120.

The eNB may provide scheduling information to a UE such as in a PCC DL transmission in subframe 114. The scheduling information may indicate a transmission window for an UL transmission 128 in the unlicensed band 120 which is offset from the subframe 114 of the PCC DL transmission. As a non-limiting example, this offset is k subframes 116. The offset may be explicitly signaled with the scheduling information or be predetermined (such as by a standard, default or by a prior configuration message).

FIG. 2 illustrates an example of a listen-before-talk LTE deployment in an unlicensed band as part of a carrier aggregation technique. Similar to FIG. 1, a PCC DL is provided on a licensed band 210. The PCC DL is separated into a series of subframes such as subframe 212, 214 and subframe 216. A SCC is provided on an unlicensed band 220.

The eNB listens during time block 222 prior to sending a DL transmission 224 on the unlicensed band 220. A WiFi transmission 225 is sent by another device; however this transmission 225 does not overlap with the LTE deployment.

The eNB provides scheduling information to a UE in subframe 214. Before the k subframes elapse, the UE listens during time block 226 to detect any WiFi transmissions on the unlicensed band 220. Since there are no such WiFi transmissions during time block 226, the UE sends an UL transmission 228 on the unlicensed band 220. In contrast, the eNB provides scheduling information to a UE in subframe 216 and before the k subframes elapse, the UE detects WiFi transmission 229 and does not send an UL transmission.

If the LTE system strictly follows listen-before-talk, its throughput is limited by the amount of time the WiFi system is active. However, since the LTE system can tolerate interference from the WiFi system, the unlicensed band is underutilized by the LTE system and its throughput reduced by preventing it from operating in the unlicensed band when the band is being actively used by the WiFi system. What is needed is a technique so that the LTE system can be deployed in the unlicensed band which more optimally utilizes the unlicensed band so that throughput of the LTE system can be improved without significantly affecting the other systems using the unlicensed band.

With listen-before-talk being implemented in an LTE deployment, the LTE deployment cannot transmit when it senses transmission on the WiFi system (as shown in FIG. 2). As a result, LTE throughput is proportionally reduced by the amount of the time it is allowed to transmit.

FIG. 3 shows LTE performance loss with listen before talk. A solid line 310 demonstrates the throughput of the LTE deployment when no listening is performed and the SCC transmissions are performed regardless of any WiFi transmission. The dashed line 320 demonstrates the throughput of the LTE deployment when listening is performed and the SCC transmissions are not performed when any WiFi transmission are detected.

As shown in FIG. 3, if the WiFi system is active 60% of the time, then the maximum normalized LTE throughput is only 40% compared to the LTE throughput when the WiFi system is not active. If the LTE is allowed to transmit all the time (regardless of whether or not the WiFi system is transmitting), the LTE system can achieve normalized LTE throughput of 62%. Thus, the LTE system loses considerable throughput by strictly following a listen before talk protocol as there is a large performance gap between LTE spectral efficiency with sensing on compared to when sensing is off. Thus, if the WiFi system is heavily used, the LTE system may prefer to use a different carrier.

Various exemplary embodiments provide new techniques for an LTE system to share an unlicensed band. Transmissions from the LTE system are allowed to coexist (be sent simultaneously) with other transmissions from separate systems using the same unlicensed band, for example, a WiFi system. The transmission power of the LTE transmissions may also be adjusted to lessen their impact on the separate systems. Therefore, such embodiments significantly increases LTE throughput while having a small impact to the WiFi system.

To minimize the performance loss illustrated in FIG. 3, the LTE system can transmit when the WiFi system is active and uses power control to minimize the impact to the WiFi system. The LTE transmit power is adjusted based on the expected amount of interference to WiFi expected to be caused by the LTE transmission. For instance, the LTE transmitter (such as an eNB or a UE) can measure the interference and adjust the transmit power based on the observed interference power, or the eNB/UE can adjust the power based on a measured pathloss from the WiFi system (which may, as a non-limiting example, be measured from beacon) and the LTE system.

In addition to power control, uplink scheduling enhancement can also be used. The eNB can estimate the amount of interference each UE is expected to generate for the WiFi system and then schedule UEs in the subframes where WiFi is active (such as those UEs that will generate little interference to the WiFi system). This may involve, for example, modifying the scheduling metric (such as a proportional-fair metric) to account for this interference in the subframes where the WiFi system is active.

FIG. 4 is a simplified signaling transmission power to time chart for a WiFi system 410 and two separate LTE deployments 420, 430. Both LTE deployments use listen before talk (or sensing). LTE deployment 430 allows power control for transmission when the WiFi system 410 is using the unlicensed band while the LTE deployment 420 does not transmits if WiFi transmissions are detected.

The WiFi system transmits two transmission, transmission 412 and transmission 414. As shown, transmission 412 has a greater transmission power than that used for transmission 414.

LTE deployment 420 has three transmissions 422, 424 and 426. These transmissions coincide with times when the WiFi system 410 is not transmitting. Similarly, LTE deployment 430 has three transmissions 432, 436 and 439 which are similar to transmissions 422, 424 and 426; however, LTE deployment 430 also includes transmissions 434 and 438 which occur simultaneously with WiFi transmissions 412, 414. Note that, as WiFi transmission 412 has a greater transmission power, the corresponding transmission 434 may also use a greater transmission power.

The transmission power may be determined using a variety of algorithms. As non-limiting example, the transmission power ($P_{tx}$) algorithm may be any one of the following:

$$P_{tx} = \text{MIN}(P_{max}, P_{min} + \alpha[PL_{pico} - PL_{wifi}]) \text{ dBm} \quad (1)$$

$$P_{tx} = P_{tx} - \text{MIN}(P_{max}, \alpha[PL_{pico} - PL_{wifi}]^{-1}) \text{ dBm} \quad (2)$$

$$P_{tx} = \text{MIN}(P_{max}, P_{min} + \alpha[PL_{pico} - PL_{wifi}] + 10\log_{10}(N_{RB})) \quad (3)$$

$$P_{tx} = \text{MAX}(P_{min}, P_{max} - \alpha \times \text{IoT}_{pico} + 10\log_{10}(N_{RB})) \quad (4)$$

where $P_{max}$ is the maximum power, $P_{min}$ is the minimum power, PL is pathloss, $N_{RB}$ is a number of resource blocks and $\alpha$ is a scaling adjustment.

Additionally, the eNB may collect historical information on local WiFi access points and the area of their influence. The eNB may then use this historical information to determine starting points for the transmission powers to use. The eNB may also consider the location of the receiver of the WiFi signal if known by the eNB.

The eNB may receive location information of the WiFi APs via LTE operator discussions with WiFi AP operators, via public or private collection and/or provision of such location information or via some other information exchange methods. The influence of the WiFi APs may be observed by the eNB or via calculations based on the locations of the WiFi APs. The eNB may also test its influence via testing signals, for further details, see U.S. Pat. Ser. No. 2010/0331026, filed Jun. 29, 2009, the disclosure of which is incorporated by reference herein in its entirety.

Figure 5:
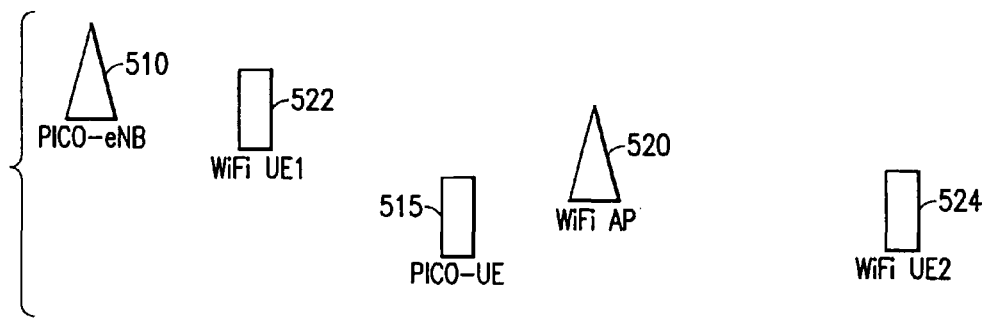
FIG. 5 is a simplified block diagram of an exemplary LTE system coexisting with a WiFi system.

FIG. 5 is a simplified block diagram of an LTE system coexisting with WiFi system. As a non-limiting example, the LTE system is a pico-cell which includes an eNB 510 and a UE 515. The coexisting WiFi system includes a WiFi AP 520 (such as a wireless router, receiving station, etc.) which communicates with two UEs: UE1 522 and UE2 524.

Without knowledge of the location of the WiFi receiving station (UE1 522 and UE2 524), it may be difficult to predict the impact of LTE interference during a WiFi transmission. For example, consider FIG. 5, where an LTE system is shown along with a WiFi system. UE1 522 and UE2 524 are shown. Interference from an LTE downlink transmission from eNB 510 is very different at the two locations. For example, there may be a large interference to UE1 522 (due to the proximity to eNB 510) whereas there may be negligible interference to UE2 524 which is farther away. Measuring the power received from the WiFi AP 520 and/or knowledge of the path loss between the AP 520 and the LTE UE 515 is insufficient in this case. Furthermore, when a WiFi transmission is sensed, the source of the transmission is also unknown, so any previous measurements cannot be readily applied on an instantaneous basis.

As non-limiting example, the WiFi receiving station is assumed to be located at the worst-case location (for example, where WiFi UE1 is located in the FIG. 5). In such a case, the first 20μs (for IEEE 802.11a) of the WiFi PDCP preamble can be decoded by the LTE system. The preamble provides information on the rate (modulation and coding scheme) used in the WiFi packet. From this, the signal-to-interference-plus-noise ratio (SINR) required for successful decoding at the WiFi receiver can be inferred by $\gamma = P_r/(P_N \beta)$, where $P_r$ is the required received power at the WiFi receiver, $P_N$ is the noise power (an assumed value), and $\beta$ is an assumed margin. From this, the targeted received power at the WiFi receiver can be calculated. If the actual received power is $P_R$, then $P_r/P_R$ provides an estimate of the path loss (for the worst-case scenario) between the LTE transmitter and the WiFi receiver. If $P_T$ is the transmit power, then the new interference can make up for the SINR margin using the following equation:

$$P_r/(P_N \beta) = P_r/(P_N \beta + P_T P_r/P_R). \quad (5)$$

From equation (5), the maximum transmit power that does not cause excessive interference can be calculated as:

$$P_{T,max} = P_r P_N (\beta - 1)/P_R. \quad (6)$$

This is an estimate for the worst-case interference. If additional information about the receiving station is available, the transmit power may be increased.

Furthermore, on a long-term basis an underestimation of interference caused by the LTE system may cause a rate adaptation in the WiFi system. If the rate is observed to be decreasing, then the transmit power can be reduced to lessen the impact on the WiFi system.

For downlink (DL) transmissions, the eNB can adjust the power on a subframe basis using a demodulation reference signal (DMRS) to identify the pilot-to-data power ratio.

For uplink (UL) transmissions, the power control formula may include network-based parameters and UE-determined parameters. For example, in the UE procedure, if the UE is given an UL grant, but then senses an on-going WiFi transmission prior to its own transmission, the UE can determine whether or not to send its transmission. This determination may be based on channel information obtained by the UE (for example, measurements of the WiFi transmission, etc.) and network provided information. Alternatively, the determination may be performed randomly. If the UE decides to send its transmission, the UE adjusts the transmission power based on the power control formula.

Additionally, a field in the UL grant may be used to inform the UE whether or not to use a power control formula and/or which algorithm to use.

Figure 6:
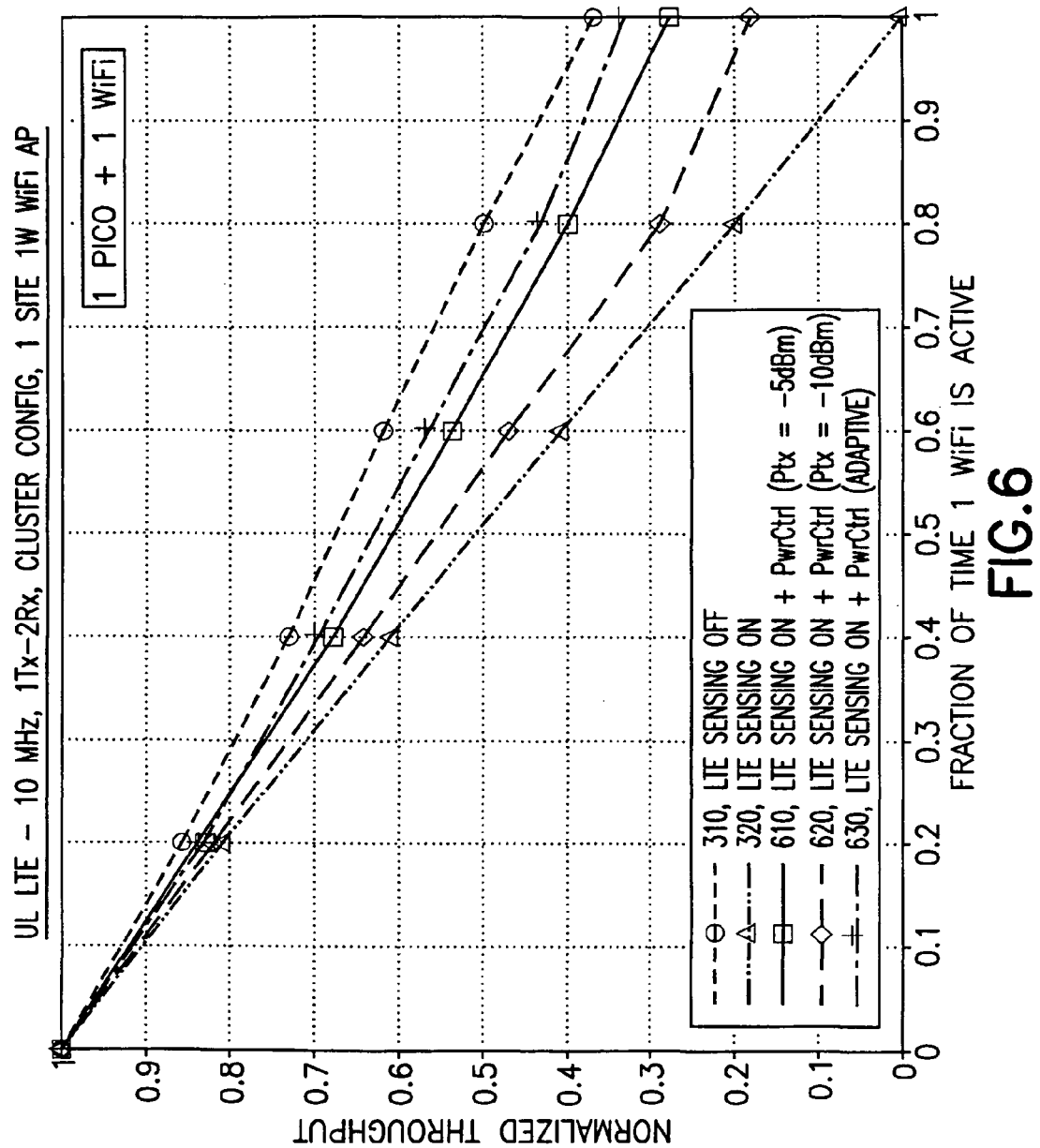
FIG. 6 illustrates the performance gain for an LTE system operating in accordance with an exemplary embodiment.
Figure 7:
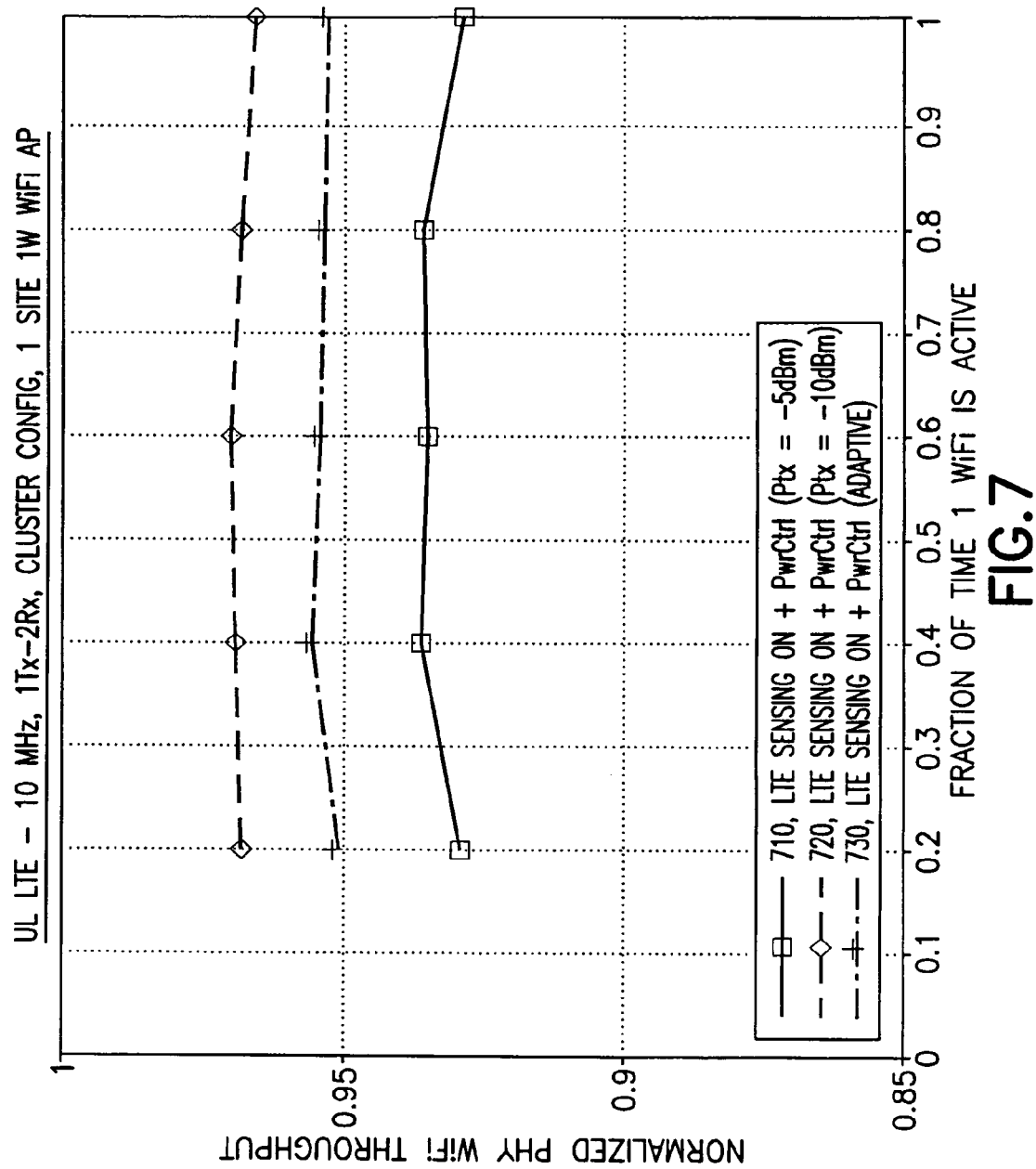
FIG. 7 illustrates the loss to WiFi PHY throughput with this power control corresponding to the embodiment shown in FIG. 6.

FIG. 6 illustrates the performance gain for LTE systems using various power control techniques and FIG. 7 illustrates the corresponding loss to WiFi PHY throughput with the various power control techniques. In this non-limiting example, the transmission power algorithm used is equation (1), where $P_{max}$=5 dBm, $P_{min}$=−20 dBm, and α=1.

FIG. 6 illustrates normalized LTE throughput in the unlicensed band for a plurality of situations. As shown in FIG. 3, solid line 310 demonstrates the throughput of the LTE deployment when no listening is performed and dashed line 320 demonstrates the throughput of the LTE deployment when listening is performed and the SCC transmissions are not performed when any WiFi transmission are detected. Line 610 demonstrates the throughput of the LTE deployment when a transmission power of −5 dBm is used when transmitting simultaneously with a WiFi transmission and line 620 demonstrates the throughput when a transmission power of −10 dBm is used. Line 630 demonstrates the throughput of the LTE deployment using a first adaptive transmission power method using the algorithm: $P_{tx}$=MIN($P_{max}$, $P_{min}$+α[$PL_{pico}$−$PL_{wifi}$]) dBm.

FIG. 7 illustrates the loss to WiFi PHY throughput experienced with the various LTE deployments using transmission power controls. Line 710 corresponds to the LTE deployment when a transmission power of −5 dBm is used, line 720 corresponds to the LTE deployment when a transmission power of −10 dBm is used and line 730 corresponds to the LTE deployment when the first adaptive transmission power method is used.

As shown in FIGS. 6 and 7, a large performance gain for the LTE system is realized with a small impact to the WiFi system. When the WiFi system is active 60% of the time, the normalized throughput for the LTE system increases from 40% (using LTE sensing to avoid simultaneous transmissions) to 56% (using adaptive power control). The corresponding loss to WiFi PHY throughput is approximately 5%. Thus, there are significantly increases to LTE throughput while having a minor impact on the WiFi system.

Figure 8:
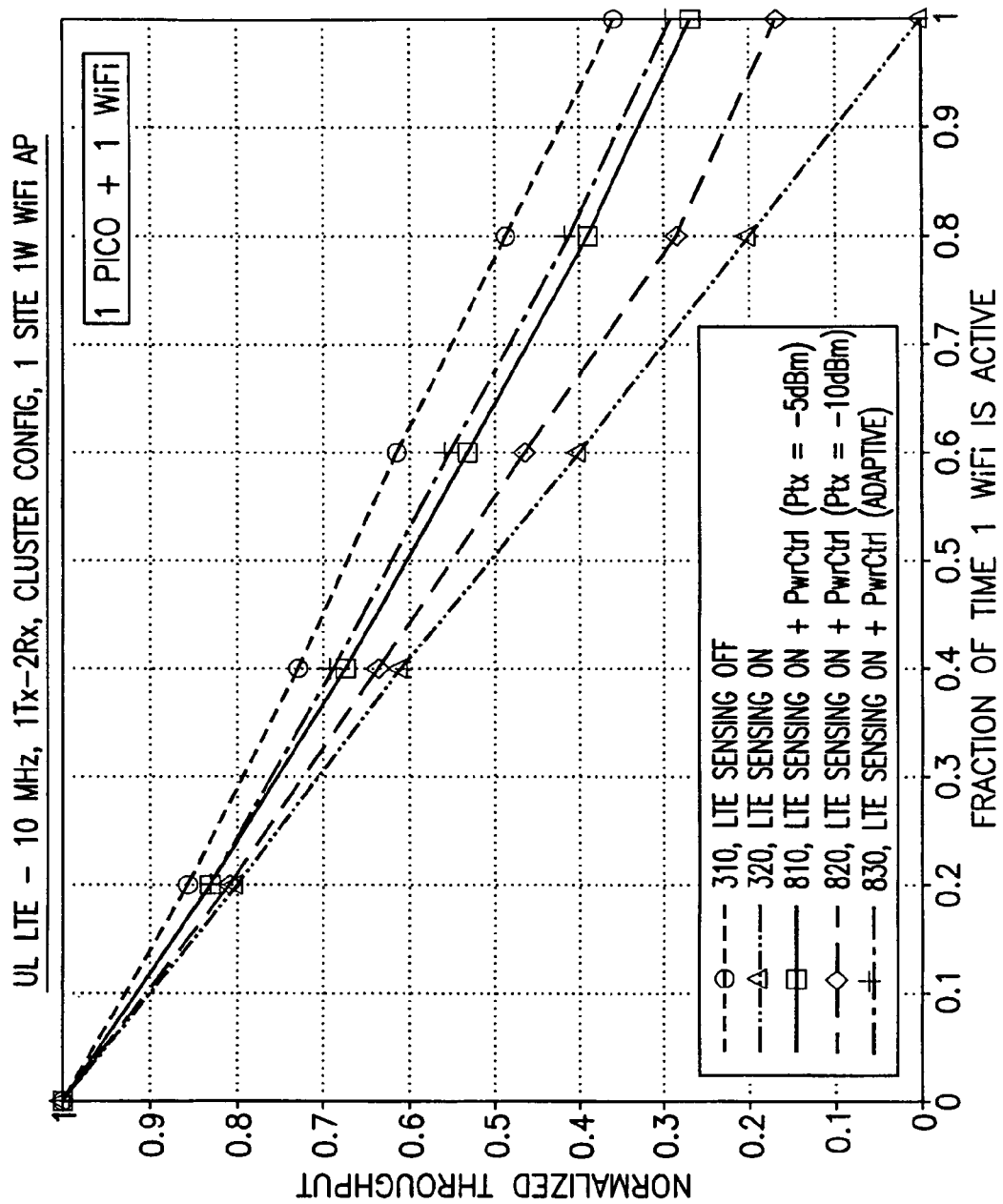
FIG. 8 illustrates the performance gain for an LTE system operating in accordance with another exemplary embodiment.

FIG. 8 illustrates normalized LTE throughput in the unlicensed band for a second adaptive transmission power method using the algorithm shown in equation (2). Solid line 310 demonstrates the throughput when no listening is performed and dashed line 320 demonstrates the throughput when listening is performed and the SCC transmissions are not performed when any WiFi transmission are detected. Line 710 demonstrates the throughput when a transmission power of −5 dBm is used and line 720 demonstrates the throughput when a transmission power of −10 dBm is used. Line 810 demonstrates the throughput of the LTE deployment using the second adaptive transmission power method.

Figure 9:
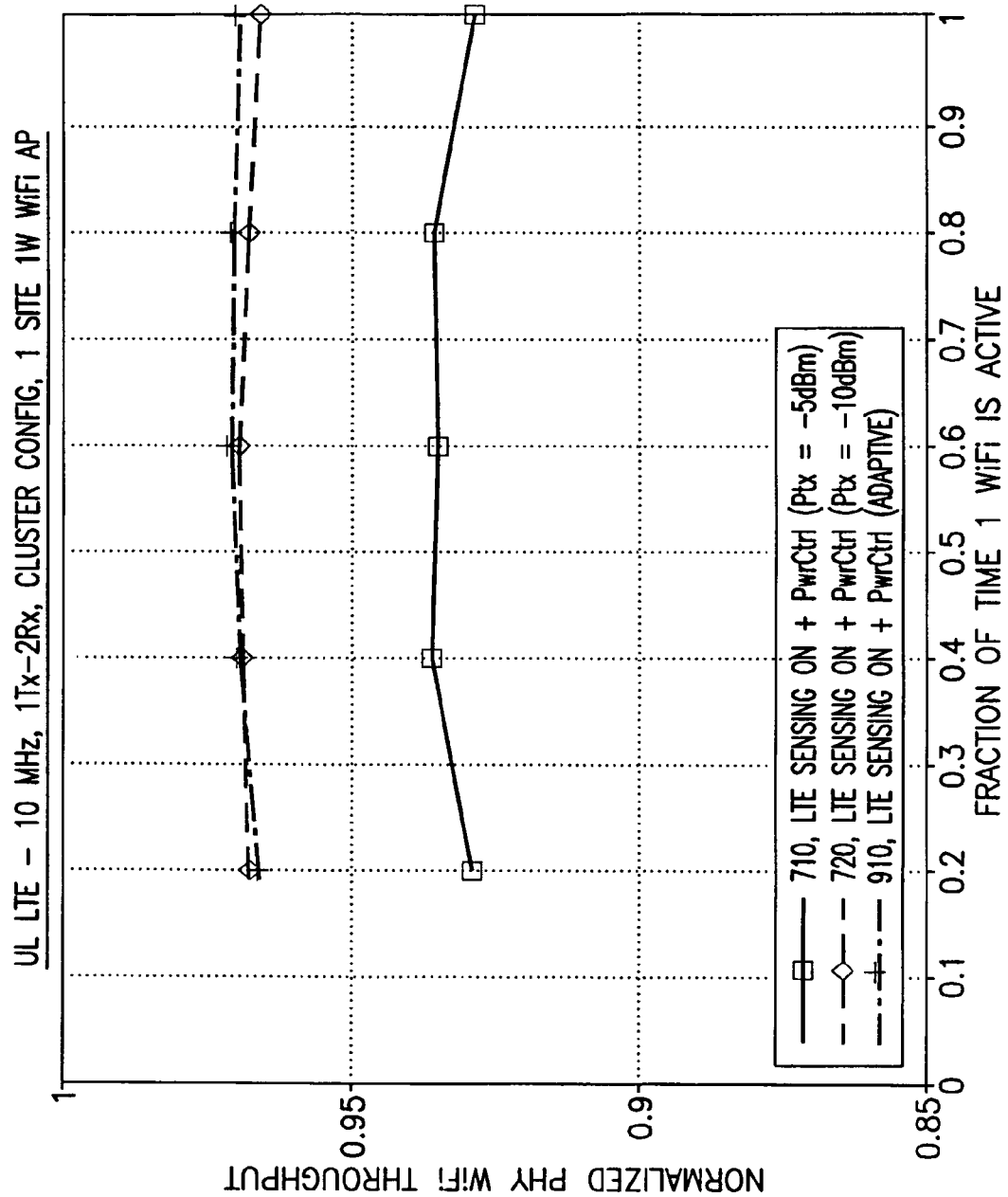
FIG. 9 illustrates the loss to WiFi PHY throughput with this power control corresponding to the embodiment shown in FIG. 8.

FIG. 9 illustrates the loss to WiFi PHY throughput when experiencing the various LTE deployment using transmission power controls. Line 710 corresponds to the LTE deployment when a transmission power of −5 dBm is used, line 720 corresponds to the LTE deployment when a transmission power of −10 dBm is used and line 910 corresponds to the LTE deployment when the second adaptive transmission power method is used.

As shown in FIGS. 8 and 9, the performance gain for the LTE system is realized with a minor impact to the WiFi system. When the WiFi system is active 60% of the time, the LTE normalized throughput increases from 40% (using LTE sensing to avoid simultaneous transmissions) to 55% (using equation (2) for the adaptive control). FIG. 9 illustrates the corresponding loss to WiFi PHY throughput is approximately 3%.

In a first exemplary embodiment, the LTE system is allowed to transmit when WiFi is active. The LTE system switches to a power control algorithm that is designed to cause minimum impact to the WiFi system.

Figure 10:
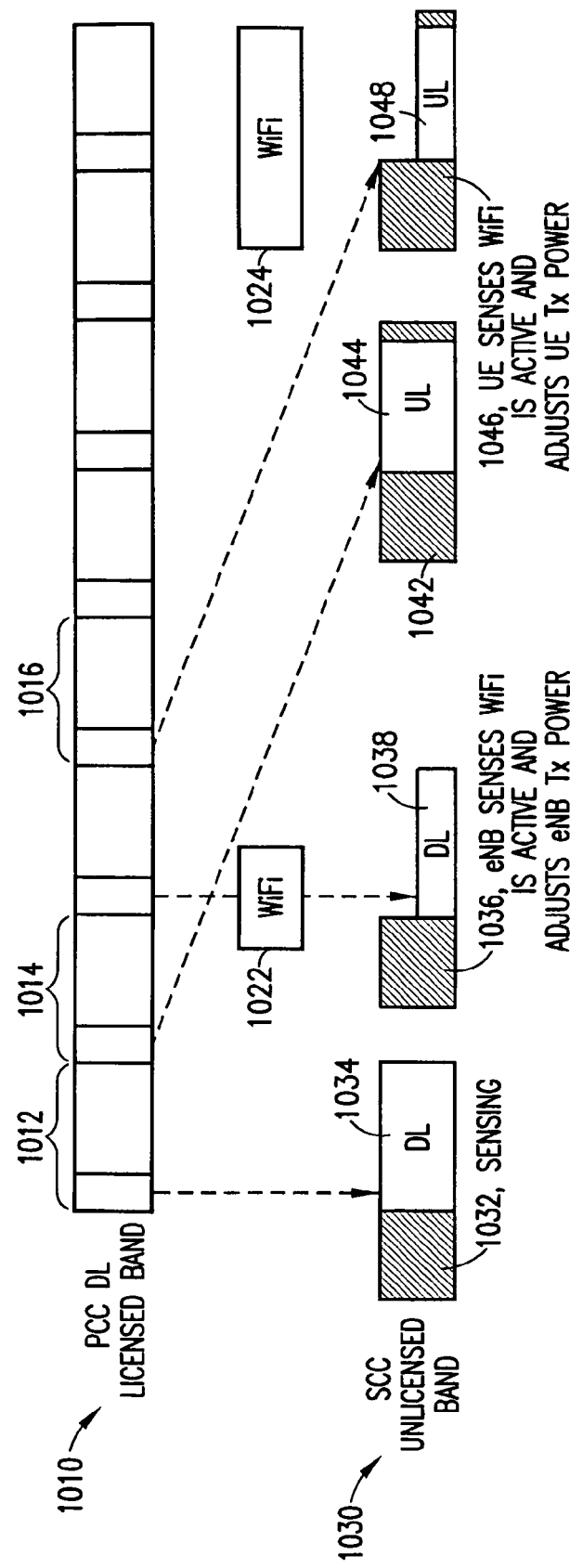
FIG. 10 illustrates an example of a listen-before-talk LTE deployment in an unlicensed band in accordance with an exemplary embodiment.

FIG. 10 illustrates an example of a listen-before-talk LTE deployment in an unlicensed band using transmission power controls. Similar to FIG. 1, a PCC DL is provided on a licensed band 1010. The PCC DL is separated into a series of subframes such as subframe 1012, 1014 and subframe 1016. A SCC is provided on an unlicensed band 1030.

During sensing block 1032 the eNB checks for WiFi transmission, finding none the eNB sends a DL transmission 1034 on the unlicensed band 1030. During a second sensing block 1036, the eNB senses WiFi transmission 1022. The eNB then determines a transmission power to use and sends a second DL transmission 1038 on the unlicensed band 1030 using the determined transmission power.

In subframe 1014, the UE receives an allocation for a transmission window for a first UL transmission 1044. During sensing block 1042 which is prior to the transmission window, the UE senses for WiFi transmissions. As none are found, the UE sends a first UL transmission 1044. This transmission may be done at a default transmission power.

In subframe 1016, the UE receives another allocation for a second transmission window for a second UL transmission 1048. During sensing block 1046 which is prior to the transmission window, the UE senses WiFi transmission 1024. Accordingly, the UE determines an adjusted transmission power and sends a second UL transmission 1048 using the adjusted transmission power.

In another exemplary embodiment, the adaptive power control is based on observed interference or a pathloss determination of the WiFi transmissions. For example, the transmission power may be determined using any one of equations (1), (2), (3) or (4).

The adaptive power control may also be based on collected historical information regarding local WiFi access points (those near the eNB) and the areas of the WiFi APs influences. Predictive model may also be used, such as a partially observable Markov Decision Process. The LTE system may use historical information on transmission and non-transmission of the other devices as bases.

Additionally, the adaptive power control may be based on a WiFi preamble inspection and an estimated WiFi SINR.

In a further exemplary embodiment, the eNB can estimate the amount of interference each UE is expected to generate for the WiFi system and then prioritize UEs that will generate little interference to WiFi system. This may involve, for example, a scheduling metric (such as a proportional-fair metric) to account for this interference. Thus, UEs which are not prioritized during WiFi transmissions may be prioritized when no WiFi transmissions are expected in order to ensure each UE is allocated sufficient bandwidth (BW).

Furthermore, the eNB may use predictive models, such as machine learning, to predict opportunities to increase transmission power or to decrease transmission power. The eNB constructs a partially observable Markov Decision Process and uses historical information on transmission and non-transmission of the other devices as bases to predict future behavior. Based on the predicted behavior, the eNB may anticipate when more or less transmission power may be used.

Figure 11:
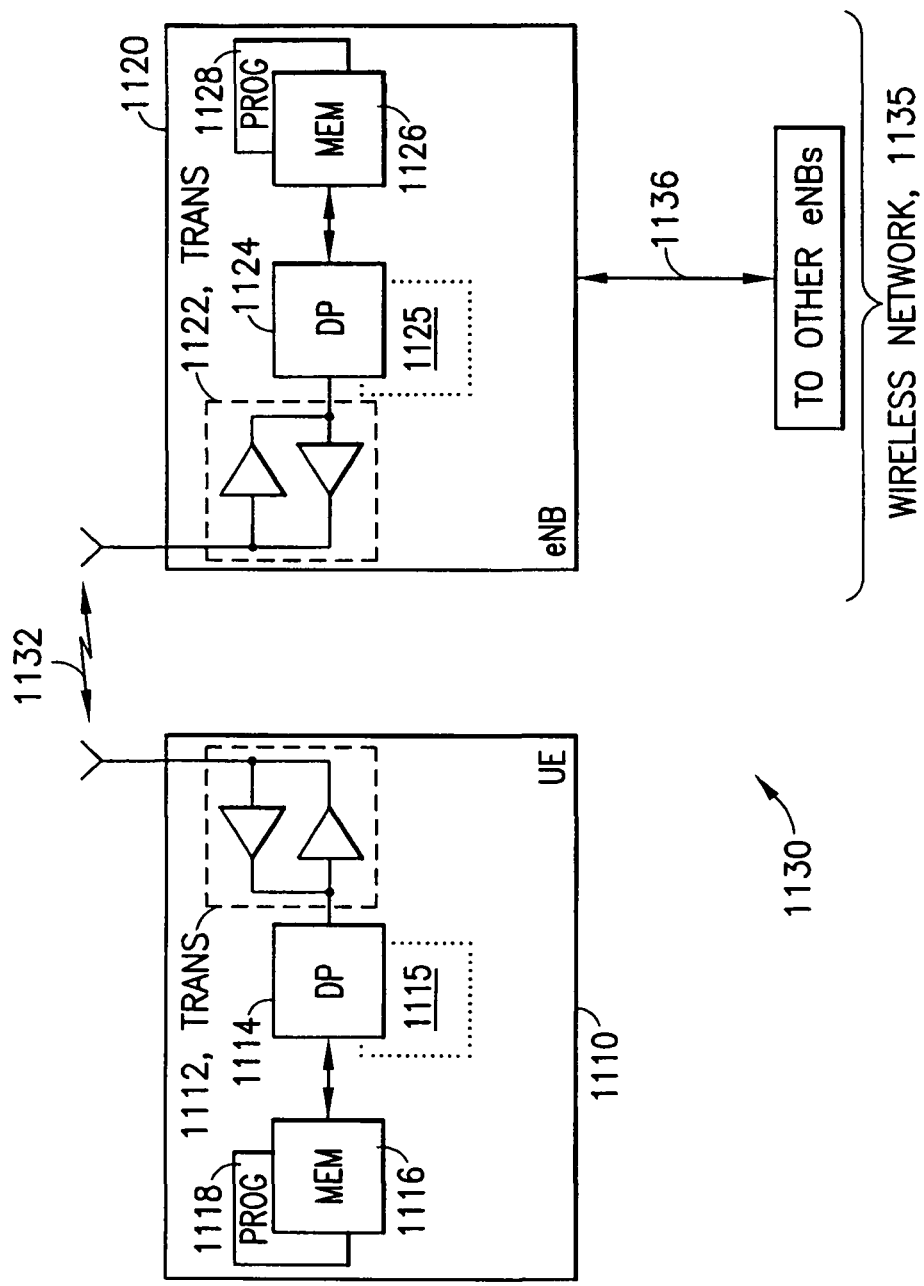
FIG. 11 shows a simplified block diagram of exemplary electronic devices that are suitable for use in practicing various exemplary embodiments.

Reference is made to FIG. 11 for illustrating a simplified block diagram of various electronic devices and apparatus that are suitable for use in practicing exemplary embodiments.

In the wireless system 1130 of FIG. 11, a wireless network 1135 is adapted for communication over a wireless link 1132 with an apparatus, such as a mobile communication device which may be referred to as a UE 1110, via a network access node, such as a Node B (base station), and more specifically an eNB 1120. The wireless link 1132 may be a carrier aggregation link comprising a PCC on a licensed band and an SCC on an unlicensed band.

The UE 1110 includes a controller, such as a computer or a data processor (DP) 1114, a computer-readable memory medium embodied as a memory (MEM) 1116 that stores a program of computer instructions (PROG) 1118, and a suitable wireless interface, such as radio frequency (RF) transceiver 1112, for bidirectional wireless communications with the eNB 1120 via one or more antennas.

The eNB 1120 also includes a controller, such as a computer or a data processor (DP) 1124, a computer-readable memory medium embodied as a memory (MEM) 1126 that stores a program of computer instructions (PROG) 1128, and a suitable wireless interface, such as RF transceiver 1122, for communication with the UE 1110 via one or more antennas. The eNB 1120 may also be coupled to another eNB via data/control path 1136, which may be implemented as an X2 interface.

At least one of the PROGs 1118 and 1128 is assumed to include program instructions that, when executed by the associated DP, enable the device to operate in accordance with exemplary embodiments, as will be discussed below in greater detail.

That is, various exemplary embodiments may be implemented at least in part by computer software executable by the DP 1114 of the UE 1110; and/or by the DP 1124 of the eNB 1120, or by hardware, or by a combination of software and hardware (and firmware).

The UE 1110 and the eNB 1120 may also include dedicated processors, for example DL power processor 1115 and UL power processor 1125.

In general, the various embodiments of the UE 1110 can include, but are not limited to, cellular telephones, tablets having wireless communication capabilities, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 1116 and 1126 may be of any type suitable to the local technical environment and may be implemented using any suitable data storage technology, such as semiconductor based memory devices, flash memory, magnetic memory devices and systems, optical memory devices and systems, fixed memory and removable memory. The DPs 1114 and 1124 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 1112 and 1122) may be of any type suitable to the local technical environment and may be implemented using any suitable communication technology such as individual transmitters, receivers, transceivers or a combination of such components.

Based on the foregoing it should be apparent that various exemplary embodiments provide a method, apparatus and computer program(s) to provide power control for transmissions in unlicensed bands.

Figure 12:
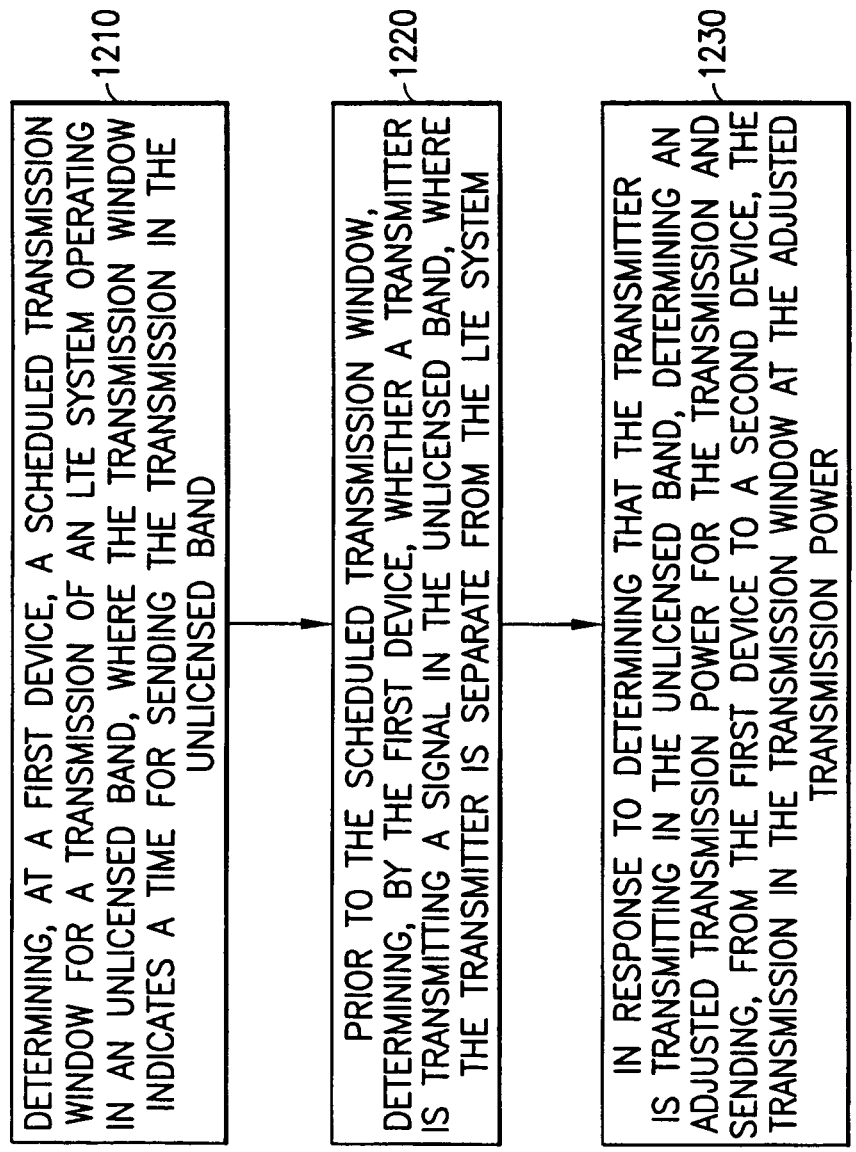
FIG. 12 is a logic flow diagram that illustrates the operation of an exemplary method, and a result of execution of computer program instructions embodied on a computer readable memory, in accordance with various exemplary embodiments.

FIG. 12 is a logic flow diagram that illustrates the operation of a method, and a result of execution of computer program instructions (such as PROGs 1118 and 1128), in accordance with exemplary embodiments. In accordance with these exemplary embodiments a method performs, at Block 1210, a step of determining, at a first device (such as an eNB or UE), a scheduled transmission window for a transmission of an LTE system operating in an unlicensed band. The transmission window indicates a time for sending the transmission in the unlicensed band. Prior to the scheduled transmission window, the method performs, at Block 1220, a step of determining, by the first device, whether a transmitter (such as a WiFi AP) is transmitting a signal in the unlicensed band. The transmitter is separate from the LTE system. At Block 1230, in response to determining that the transmitter is transmitting in the unlicensed band, the method performs a step of determining an adjusted transmission power for the transmission and sending, from the first device to a second device, the transmission in the transmission window at the adjusted transmission power.

Figure 13:
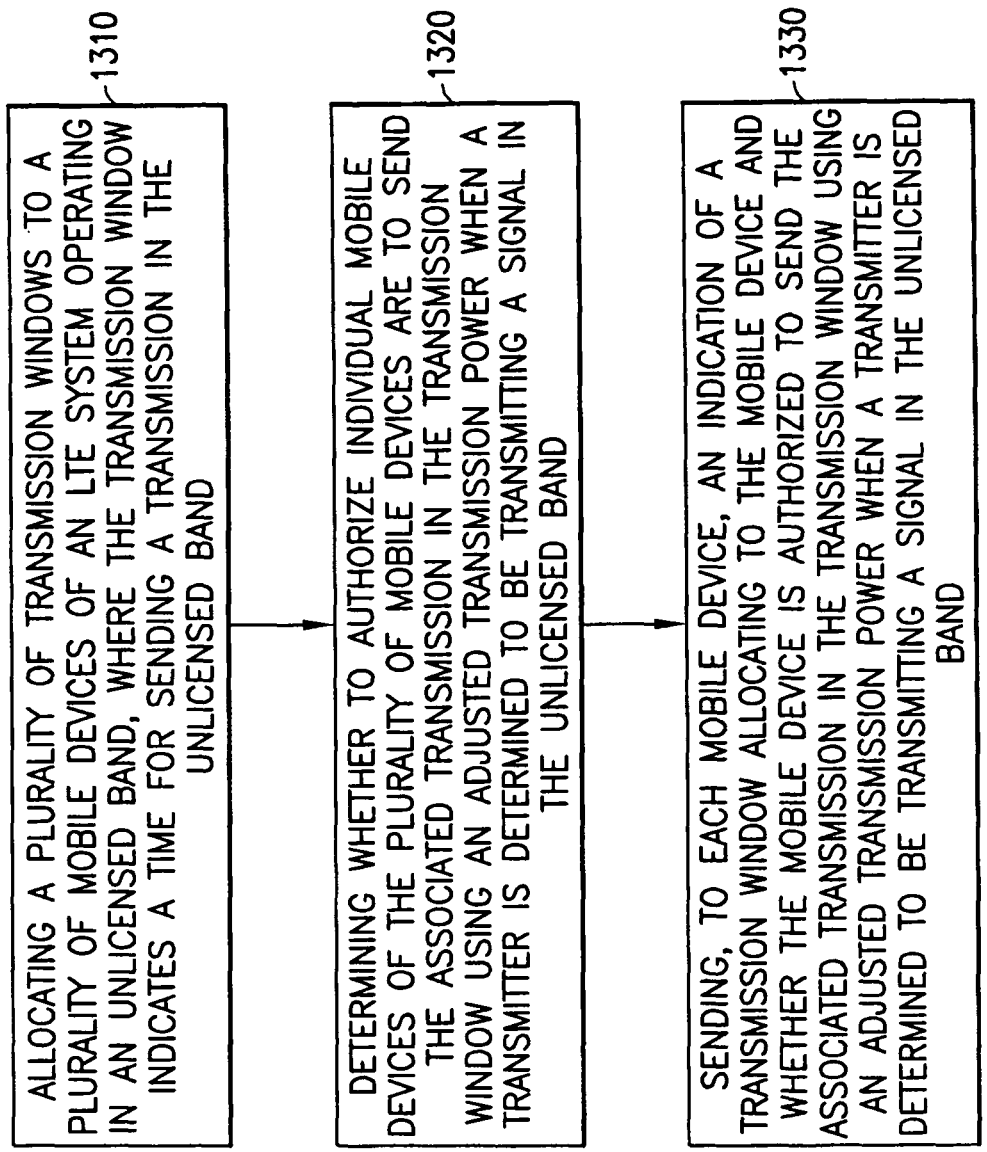
FIG. 13 is another logic flow diagram that illustrates the operation of another exemplary method, and a result of execution of computer program instructions embodied on a computer readable memory, in accordance with various exemplary embodiments.

Figure 13 is another logic flow diagram that illustrates the operation of another method, and a result of execution of computer program instructions (such as PROG 1128), in accordance with exemplary embodiments. In accordance with these exemplary embodiments a method performs, at Block 1310, a step of allocating a plurality of transmission windows to a plurality of mobile devices of an LTE system operating in an unlicensed band. The transmission window indicates a time for sending a transmission in the unlicensed band. At Block 1320, the method performs a step of determining whether to authorize individual mobile devices of the plurality of mobile devices are to send the associated transmission in the transmission window using an adjusted transmission power when a transmitter is determined to be transmitting a signal in the unlicensed band. The method also performs, at Block 1330, a step of sending, to each mobile device, an indication of a) a transmission window allocating to the mobile device and b) whether the mobile device is authorized to send the associated transmission in the transmission window using an adjusted transmission power when a transmitter is determined to be transmitting a signal in the unlicensed band.

The various blocks shown in FIGS. 12 and 13 may be viewed as method steps, and/or as operations that result from operation of computer program code, and/or as a plurality of coupled logic circuit elements constructed to carry out the associated function(s).

An exemplary embodiment provides a method for power control for LTE transmissions in unlicensed bands. The method includes determining (such as by a processor), at a first device (such as a LTE UE or LTE eNB), a scheduled transmission window for a transmission of an LTE system operating in an unlicensed band. The transmission window indicates a time for sending the transmission in the unlicensed band. Prior to the scheduled transmission window, the method also includes determining (such as by a processor), by the first device, whether a transmitter is transmitting a signal in the unlicensed band. The transmitter is separate from the LTE system. The method also includes, in response to determining that the transmitter is transmitting in the unlicensed band, determining (such as by a processor) an adjusted transmission power for the transmission and sending (such as via a transmitter), from the first device to a second device, the transmission in the transmission window at the adjusted transmission power.

In a further exemplary embodiment of the method above, the transmitter is a WiFi AP.

In another exemplary embodiment of any one of the methods above, the transmitter is a WiFi mobile device.

In a further exemplary embodiment of any one of the methods above, determining the scheduled transmission window includes receiving an allocation of the transmission window. The allocation of the transmission window may be received on a primary component carrier in a licensed band.

In another exemplary embodiment of any one of the methods above, the transmission is a secondary component carrier transmission.

In a further exemplary embodiment of any one of the methods above, determining the adjusted transmission power is based on historic information of the transmitter; location information of the first device; and/or location information of the transmitter.

In another exemplary embodiment of any one of the methods above, the method also includes determining channel status information of the signal. The adjusted transmission power is based at least in part on the channel status information. Determining the channel status information may include determining a rate of the signal; a modulation of the signal; a coding scheme of the signal and/or a path loss of the signal. The method may also include sending the channel status information to the second device.

In a further exemplary embodiment of any one of the methods above, the method also includes determining whether an authorization has been received, where the authorization indicates to send the transmission in the transmission window using the adjusted transmission power if the transmitter is determined to be transmitting the signal in the unlicensed band and, in response to not receiving the authorization and determining that the transmitter is transmitting in the unlicensed band, preventing sending the transmission in the transmission window.

In another exemplary embodiment of any one of the methods above, the method also includes determining whether an authorization has been received. The authorization indicates to send the transmission in the transmission window using the adjusted transmission power when the transmitter is determined to be transmitting the signal in the unlicensed band. In response to receiving the authorization and determining that the transmitter is transmitting in the unlicensed band, the method includes determining whether to send the transmission in the transmission window. Determining whether to send the transmission in the transmission window may be based at least in part on channel status information of the signal, network provided information and/or a random calculation.

In a further exemplary embodiment of any one of the methods above, the method also includes receiving an uplink grant. The uplink grant includes a field which indicates a power control formula to use when determining the adjusted transmission power.

Another exemplary embodiment provides a method for power control for LTE transmissions in unlicensed bands. The method includes allocating (such as by a processor) a plurality of transmission windows to a plurality of mobile devices of an LTE system operating in an unlicensed band. The transmission window indicates a time for sending a transmission in the unlicensed band. The method also includes determining (such as by a processor) whether to authorize individual mobile devices of the plurality of mobile devices are to send the associated transmission in the transmission window using an adjusted transmission power if a transmitter is determined to be transmitting a signal in the unlicensed band during the transmission window. The method also includes sending (such as via a transmitter), to each mobile device, an indication of a transmission window allocated to the mobile device and an indication of whether the mobile device is authorized to send the associated transmission in the transmission window using an adjusted transmission power if a transmitter is determined to be transmitting a signal in the unlicensed band during the transmission window.

In a further exemplary embodiment of the method above, determining whether to authorize individual mobile devices includes, for each individual mobile device, determining an expected level of interference to be experienced by a receiver receiving the signal. The interference is caused by the individual mobile device sending the associated transmission in the transmission window. The plurality of mobile devices is prioritized based on the expected level of interference. The method also includes authorizing individual mobile devices based on the prioritization. The expected level of interference is based on a worst-case scenario for a location of a receiver of the signal. Additionally, the expected level of interference for the individual mobile device may be based on a location of the individual mobile device. The plurality of mobile devices may be prioritized such that individual mobile device which are expected to produce less interference are prioritized before individual mobile device which are expected to produce greater interference.

Another exemplary embodiment provides an apparatus for power control for LTE transmissions in unlicensed bands. The apparatus (such as UE 1110 and eNB 1120) includes at least one processor (such as DPs 1114, 1115, 1124 and 1125); and at least one memory (such as MEMs 1116 and 1126) storing computer program code (such as PROGs 1118 and 1128). The at least one memory and the computer program code are configured to, with the at least one processor, cause the apparatus to perform actions. The actions include to determine a scheduled transmission window for a transmission of an LTE system operating in an unlicensed band. The transmission window indicates a time for sending the transmission in the unlicensed band. Prior to the scheduled transmission window, the actions also include to determine whether a transmitter is transmitting a signal in the unlicensed band. The transmitter is separate from the LTE system. The actions also include, in response to determining that the transmitter is transmitting in the unlicensed band, to determine an adjusted transmission power for the transmission and to send, to a second apparatus (such as from a UE to an eNB or from an eNB to a UE), the transmission in the transmission window at the adjusted transmission power.

In a further exemplary embodiment of the apparatus above, the transmitter is a WiFi AP.

In another exemplary embodiment of any one of the apparatus above, the transmitter is a WiFi mobile device.

In a further exemplary embodiment of any one of the apparatus above, determining the scheduled transmission window includes receiving an allocation of the transmission window. The allocation of the transmission window may be received on a primary component carrier in a licensed band.

In another exemplary embodiment of any one of the apparatus above, the transmission is a secondary component carrier transmission.

In a further exemplary embodiment of any one of the apparatus above, determining the adjusted transmission power is based on historic information of the transmitter; location information of the first device; and/or location information of the transmitter.

In another exemplary embodiment of any one of the apparatus above, the actions also include to determine channel status information of the signal. The adjusted transmission power is based at least in part on the channel status information. Determining the channel status information may include to determine a rate of the signal; a modulation of the signal; a coding scheme of the signal and/or a path loss of the signal. The actions may also include to send the channel status information to the second device.

In a further exemplary embodiment of any one of the apparatus above, the actions also include to determine whether an authorization has been received, where the authorization indicates to send the transmission in the transmission window using the adjusted transmission power if the transmitter is determined to be transmitting the signal in the unlicensed band and, in response to not receiving the authorization and determining that the transmitter is transmitting in the unlicensed band, to prevent sending the transmission in the transmission window.

In another exemplary embodiment of any one of the apparatus above, the actions also include to determine whether an authorization has been received. The authorization indicates to send the transmission in the transmission window using the adjusted transmission power when the transmitter is determined to be transmitting the signal in the unlicensed band. In response to receiving the authorization and determining that the transmitter is transmitting in the unlicensed band, the method includes determining whether to send the transmission in the transmission window. Determining whether to send the transmission in the transmission window may be based at least in part on channel status information of the signal, network provided information and/or a random calculation.

In a further exemplary embodiment of any one of the apparatus above, the actions also include to receive an uplink grant. The uplink grant includes a field which indicates a power control formula to use when determining the adjusted transmission power.

In another exemplary embodiment of any one of the apparatus above, the apparatus is embodied in a mobile device.

In a further exemplary embodiment of any one of the apparatus above, the apparatus is embodied in an integrated circuit.

Another exemplary embodiment provides an apparatus of power control for LTE transmissions in unlicensed bands. The apparatus (such as eNB 1120) includes at least one processor (such as DPs 1124 and 1125); and at least one memory (such as MEM 1126) storing computer program code (such as PROG 1128). The at least one memory and the computer program code are configured to, with the at least one processor, cause the apparatus to perform actions. The actions include to allocate a plurality of transmission windows to a plurality of mobile devices of an LTE system operating in an unlicensed band. The transmission window indicates a time for sending a transmission in the unlicensed band. The actions also include to determine whether to authorize individual mobile devices of the plurality of mobile devices are to send the associated transmission in the transmission window using an adjusted transmission power if a transmitter is determined to be transmitting a signal in the unlicensed band during the transmission window. The actions also include to send, to each mobile device, an indication of a transmission window allocated to the mobile device and an indication of whether the mobile device is authorized to send the associated transmission in the transmission window using an adjusted transmission power if a transmitter is determined to be transmitting a signal in the unlicensed band during the transmission window.

In a further exemplary embodiment of the apparatus above, determining whether to authorize individual mobile devices includes, for each individual mobile device, determining an expected level of interference to be experienced by a receiver receiving the signal. The interference is caused by the individual mobile device sending the associated transmission in the transmission window. The plurality of mobile devices is prioritized based on the expected level of interference. The actions also include to authorize individual mobile devices based on the prioritization. The expected level of interference is based on a worst-case scenario for a location of a receiver of the signal. Additionally, the expected level of interference for the individual mobile device may be based on a location of the individual mobile device. The plurality of mobile devices may be prioritized such that individual mobile device which are expected to produce less interference are prioritized before individual mobile device which are expected to produce greater interference.

In another exemplary embodiment of any one of the apparatus above, the apparatus is embodied in a mobile device.

In a further exemplary embodiment of any one of the apparatus above, the apparatus is embodied in an integrated circuit.

Another exemplary embodiment provides a computer readable medium for power control for LTE transmissions in unlicensed bands. The computer readable medium (such as MEMs 1116 and 1126) is tangibly encoded with a computer program (such as PROGs 1118 and 1128) executable by a processor to perform actions. The actions include determining, at a first device (such as a LTE UE or LTE eNB), a scheduled transmission window for a transmission of an LTE system operating in an unlicensed band. The transmission window indicates a time for sending the transmission in the unlicensed band. Prior to the scheduled transmission window, the actions also include determining, by the first device, whether a transmitter is transmitting a signal in the unlicensed band. The transmitter is separate from the LTE system. The actions also include, in response to determining that the transmitter is transmitting in the unlicensed band, determining an adjusted transmission power for the transmission and sending, from the first device to a second device, the transmission in the transmission window at the adjusted transmission power.

In a further exemplary embodiment of the computer readable medium above, the transmitter is a WiFi AP.

In another exemplary embodiment of any one of the computer readable media above, the transmitter is a WiFi mobile device.

In a further exemplary embodiment of any one of the computer readable media above, determining the scheduled transmission window includes receiving an allocation of the transmission window. The allocation of the transmission window may be received on a primary component carrier in a licensed band.

In another exemplary embodiment of any one of the computer readable media above, the transmission is a secondary component carrier transmission.

In a further exemplary embodiment of any one of the computer readable media above, determining the adjusted transmission power is based on historic information of the transmitter; location information of the first device; and/or location information of the transmitter.

In another exemplary embodiment of any one of the computer readable media above, the actions also include determining channel status information of the signal. The adjusted transmission power is based at least in part on the channel status information. Determining the channel status information may include determining a rate of the signal; a modulation of the signal; a coding scheme of the signal and/or a path loss of the signal. The actions may also include sending the channel status information to the second device.

In a further exemplary embodiment of any one of the computer readable media above, the actions also include determining whether an authorization has been received, where the authorization indicates to send the transmission in the transmission window using the adjusted transmission power if the transmitter is determined to be transmitting the signal in the unlicensed band and, in response to not receiving the authorization and determining that the transmitter is transmitting in the unlicensed band, preventing sending the transmission in the transmission window.

In another exemplary embodiment of any one of the computer readable media above, the actions also include determining whether an authorization has been received. The authorization indicates to send the transmission in the transmission window using the adjusted transmission power when the transmitter is determined to be transmitting the signal in the unlicensed band. In response to receiving the authorization and determining that the transmitter is transmitting in the unlicensed band, the method includes determining whether to send the transmission in the transmission window. Determining whether to send the transmission in the transmission window may be based at least in part on channel status information of the signal, network provided information and/or a random calculation.

In a further exemplary embodiment of any one of the computer readable media above, the actions also include receiving an uplink grant. The uplink grant includes a field which indicates a power control formula to use when determining the adjusted transmission power.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides a computer readable medium for power control for LTE transmissions in unlicensed bands. The computer readable medium (such as MEM 1126) is tangibly encoded with a computer program (such as PROG 1128) executable by a processor to perform actions. The actions include allocating a plurality of transmission windows to a plurality of mobile devices of an LTE system operating in an unlicensed band. The transmission window indicates a time for sending a transmission in the unlicensed band. The actions also include determining whether to authorize individual mobile devices of the plurality of mobile devices are to send the associated transmission in the transmission window using an adjusted transmission power if a transmitter is determined to be transmitting a signal in the unlicensed band during the transmission window. The actions also include sending, to each mobile device, an indication of a transmission window allocated to the mobile device and an indication of whether the mobile device is authorized to send the associated transmission in the transmission window using an adjusted transmission power if a transmitter is determined to be transmitting a signal in the unlicensed band during the transmission window.

In a further exemplary embodiment of the computer readable media above, determining whether to authorize individual mobile devices includes, for each individual mobile device, determining an expected level of interference to be experienced by a receiver receiving the signal. The interference is caused by the individual mobile device sending the associated transmission in the transmission window. The plurality of mobile devices is prioritized based on the expected level of interference. The actions also include authorizing individual mobile devices based on the prioritization. The expected level of interference is based on a worst-case scenario for a location of a receiver of the signal. Additionally, the expected level of interference for the individual mobile device may be based on a location of the individual mobile device. The plurality of mobile devices may be prioritized such that individual mobile device which are expected to produce less interference are prioritized before individual mobile device which are expected to produce greater interference.

In another exemplary embodiment of any one of the computer readable media above, the computer readable medium is a non-transitory computer readable medium (e.g., CD-ROM, RAM, flash memory, etc.).

In a further exemplary embodiment of any one of the computer readable media above, the computer readable medium is a storage medium.

Another exemplary embodiment provides an apparatus (such as UE 1110 and eNB 1120) for power control for LTE transmissions in unlicensed bands. The apparatus includes means for determining (such as a processor) a scheduled transmission window for a transmission of an LTE system operating in an unlicensed band. The transmission window indicates a time for sending the transmission in the unlicensed band. The apparatus also includes means for determining (such as a processor), prior to the scheduled transmission window, whether a transmitter is transmitting a signal in the unlicensed band. The transmitter is separate from the LTE system. The apparatus also includes means for determining (such as a processor) an adjusted transmission power for the transmission and means for sending to a second device (such as a transmitter) the transmission in the transmission window at the adjusted transmission power in response to determining that the transmitter is transmitting in the unlicensed band.

In a further exemplary embodiment of the apparatus above, the transmitter is a WiFi AP.

In another exemplary embodiment of any one of the apparatus above, the transmitter is a WiFi mobile device.

In a further exemplary embodiment of any one of the apparatus above, the scheduled transmission window determining means includes means for receiving an allocation of the transmission window. The allocation of the transmission window may be received on a primary component carrier in a licensed band.

In another exemplary embodiment of any one of the apparatus above, the transmission is a secondary component carrier transmission.

In a further exemplary embodiment of any one of the apparatus above, determining the adjusted transmission power is based on historic information of the transmitter; location information of the first device; and/or location information of the transmitter.

In another exemplary embodiment of any one of the apparatus above, the apparatus also includes means for determining channel status information of the signal. The adjusted transmission power is based at least in part on the channel status information. The channel status information determining means may include means for determining a rate of the signal; a modulation of the signal; a coding scheme of the signal and/or a path loss of the signal. The apparatus may also include means for sending the channel status information to the second device.

In a further exemplary embodiment of any one of the apparatus above, the apparatus also includes means for determining whether an authorization has been received, where the authorization indicates to send the transmission in the transmission window using the adjusted transmission power if the transmitter is determined to be transmitting the signal in the unlicensed band and means for preventing sending the transmission in the transmission window in response to not receiving the authorization and determining that the transmitter is transmitting in the unlicensed band.

In another exemplary embodiment of any one of the apparatus above, the apparatus also includes means for determining whether an authorization has been received. The authorization indicates to send the transmission in the transmission window using the adjusted transmission power when the transmitter is determined to be transmitting the signal in the unlicensed band. In response to receiving the authorization and determining that the transmitter is transmitting in the unlicensed band, the method includes determining whether to send the transmission in the transmission window. Determining whether to send the transmission in the transmission window may be based at least in part on channel status information of the signal, network provided information and/or a random calculation.

In a further exemplary embodiment of any one of the apparatus above, the apparatus also includes means for receiving an uplink grant. The uplink grant includes a field which indicates a power control formula to use when determining the adjusted transmission power.

Another exemplary embodiment provides an apparatus (such as eNB 1120) for power control for LTE transmissions in unlicensed bands. The apparatus includes means for allocating (such as a processor) a plurality of transmission windows to a plurality of mobile devices of an LTE system operating in an unlicensed band. The transmission window indicates a time for sending a transmission in the unlicensed band. The apparatus also includes means for determining (such as a processor) whether to authorize individual mobile devices of the plurality of mobile devices are to send the associated transmission in the transmission window using an adjusted transmission power if a transmitter is determined to be transmitting a signal in the unlicensed band during the transmission window. The apparatus also includes means for sending (such as a transmitter), to each mobile device, an indication of a transmission window allocated to the mobile device and an indication of whether the mobile device is authorized to send the associated transmission in the transmission window using an adjusted transmission power if a transmitter is determined to be transmitting a signal in the unlicensed band during the transmission window.

In a further exemplary embodiment of the apparatus above, the determining means includes means for determining, for each individual mobile device, an expected level of interference to be experienced by a receiver receiving the signal. The interference is caused by the individual mobile device sending the associated transmission in the transmission window. The apparatus also includes means for prioritizing the plurality of mobile devices based on the expected level of interference. The apparatus also includes means for authorizing individual mobile devices based on the prioritization. The expected level of interference is based on a worst-case scenario for a location of a receiver of the signal. Additionally, the expected level of interference for the individual mobile device may be based on a location of the individual mobile device. The plurality of mobile devices may be prioritized such that individual mobile device which are expected to produce less interference are prioritized before individual mobile device which are expected to produce greater interference.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although not limited thereto. While various aspects of the exemplary embodiments may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments may be practiced in various components such as integrated circuit chips and modules, and that the exemplary embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments.

Various modifications and adaptations to the foregoing exemplary embodiments may become apparent to those skilled in the relevant arts in view of the foregoing description, when read in conjunction with the accompanying drawings. However, any and all modifications will still fall within the scope of the non-limiting and exemplary embodiments.

For example, while the exemplary embodiments have been described above in the context of the E-UTRAN (UTRAN-LTE) system, it should be appreciated that the exemplary embodiments are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names assigned to different channels (e.g., PCC, SCC, etc.) are not intended to be limiting in any respect, as these various channels may be identified by any suitable names.

Furthermore, some of the features of the various non-limiting and exemplary embodiments may be used to advantage without the corresponding use of other features. As such, the foregoing description should be considered as merely illustrative of the principles, teachings and exemplary embodiments, and not in limitation thereof.

What is claimed is:

1. A method comprising:
receiving, at a first device, an allocated transmission window of time for a transmission of an evolved universal terrestrial radio access network system operating in an unlicensed band, where the transmission window indicates a time for sending the transmission in the unlicensed band;
prior to the allocated transmission window of time, determining, by the first device, whether a transmitter is transmitting a signal in the unlicensed band, where the transmitter is separate from the evolved universal terrestrial radio access network system;
in response to determining that the transmitter is transmitting in the unlicensed band, determining an adjusted transmission power for the transmission, where determining the adjusted transmission power is based on at least a measured interference level of the transmitting; and
sending, from the first device to a second device, the transmission in the unlicensed band during the allocated transmission window of time at the adjusted transmission power.

2. The method of claim 1, where the transmitter is one of: a WiFi access point and a WiFi mobile device.

3. The method of claim 1, where the allocated transmission window of time is received from an access node of the evolved universal terrestrial radio access network system.

4. The method of claim 1, where receiving the allocation of the transmission window of time comprises receiving the allocation of the transmission window on a primary component carrier in a licensed band.

5. The method of claim 1, where the transmission is a secondary component carrier transmission.

6. The method of claim 1, where determining the adjusted transmission power is further based on historic information of the transmitter; path loss information; location information of the first device; and location information of the transmitter.

7. The method of claim 1, further comprising determining channel status information of the signal, where determining the adjusted transmission power is based at least in part on the channel status information.

8. The method of claim 7, where determining the channel status information comprises determining at least one of a rate of the signal; a modulation of the signal; a coding scheme of the signal; and a path loss of the signal.

9. The method of claim 8, further comprising sending the channel status information to the second device.

10. The method of claim 1, further comprising:
determining whether an authorization has been received, where the authorization indicates to send the transmission in the transmission window using the adjusted transmission power when the transmitter is determined to be transmitting the signal in the unlicensed band; and
in response to not receiving the authorization and determining that the transmitter is transmitting in the unlicensed band, preventing sending the transmission in the transmission window.

11. The method of claim 1, determining whether an authorization has been received, where the authorization indicates to send the transmission in the transmission window using the adjusted transmission power when the transmitter is determined to be transmitting the signal in the unlicensed band; and
in response to receiving the authorization and determining that the transmitter is transmitting in the unlicensed band, determining whether to send the transmission in the transmission window,
where determining whether to send the transmission in the transmission window is based at least in part on at least one of: channel status information of the signal, network provided information, and a random calculation.

12. The method of claim 1, further comprising receiving an uplink grant, where the uplink grant comprises a field and where the field indicates a power control formula to use when determining the adjusted transmission power.

13. An apparatus, comprising:
at least one processor; and
at least one memory including computer program code, the at least one memory and the computer program code configured to, with the at least one processor, cause the apparatus to:
receive an allocated transmission window of time for a transmission of an evolved universal terrestrial radio access network system operating in an unlicensed band, where the transmission window indicates a time for sending the transmission in the unlicensed band;
prior to the allocated transmission window of time, determine whether a transmitter is transmitting a signal in the unlicensed band, where the transmitter is separate from the evolved universal terrestrial radio access network system;
in response to determining that the transmitter is transmitting in the unlicensed band, determine an adjusted transmission power for the transmission, where determining the adjusted transmission power is based on at least a measured interference level of the transmitting; and
send, to a second apparatus, the transmission in the unlicensed band during the allocated transmission window at the adjusted transmission power.

14. The apparatus of claim 13, where the allocated transmission window of time is received on a primary component carrier in a licensed band and where the transmission is a secondary component carrier transmission.

15. The apparatus of claim 13, where the at least one memory and the computer program code are further configured to cause the apparatus to determine channel status information of the signal, where determining the adjusted transmission power is based at least in part on the channel status information.

16. A non-transitory computer readable medium tangibly encoded with a computer program executable by a processor to perform actions comprising:

receiving, at a first device, an allocated transmission window of time for a transmission of an evolved universal terrestrial radio access network system operating in an unlicensed band, where the transmission window indicates a time for sending the transmission in the unlicensed band;

prior to the allocated transmission window of time, determining, by the first device, whether a transmitter is transmitting a signal in the unlicensed band, where the transmitter is separate from the evolved universal terrestrial radio access network system;

in response to determining that the transmitter is transmitting in the unlicensed band, determining an adjusted transmission power for the transmission, where determining the adjusted transmission power is based on at least a measured interference level of the transmitting; and sending, from the first device to a second device, the transmission in the unlicensed band during the allocated transmission window of time at the adjusted transmission power.

17. The non-transitory computer readable medium of claim 16, where determining the scheduled transmission window comprises receiving an allocation of the transmission window on a primary component carrier in a licensed band and where the transmission is a secondary component carrier transmission.

18. The non-transitory computer readable medium of claim 16, where the actions further comprise determining channel status information of the signal, where determining the adjusted transmission power is based at least in part on the channel status information.

19. A method comprising:

allocating a plurality of transmission windows of time to a plurality of mobile devices of an long term evolution system operating in an unlicensed band, where the transmission windows of time each indicate a time for sending a transmission in the unlicensed band;

determining whether to authorize individual mobile devices of the plurality of mobile devices are to send an associated transmission in an allocated transmission window using an adjusted transmission power when a transmitter is determined to be transmitting a signal in the unlicensed band, where the adjusted transmission power is based on at least a measured interference level of the transmitting; and sending, to each mobile device, an indication of a transmission window allocated to the mobile device and indicating whether the mobile device is authorized to send the associated transmission in the transmission window using an adjusted transmission power when a transmitter is determined to be transmitting a signal in the unlicensed band.

20. The method of claim 19, where determining whether to authorize individual mobile devices comprises, for each individual mobile device, determining an expected level of interference to be experienced by a receiver receiving the signal, where the interference is caused by the individual mobile device sending the associated transmission in the transmission window and the plurality of mobile devices is prioritized based on the expected level of interference.

\* \* \* \* \*